United States Patent
Belt et al.

(10) Patent No.: US 12,256,294 B2
(45) Date of Patent: Mar. 18, 2025

(54) SYSTEMS AND METHODS FOR WIRELESS PHYSICAL CONDITION INSTRUCTION GENERATION

(71) Applicant: Blind InSites, LLC, Plano, TX (US)

(72) Inventors: Darwin Wayne Belt, Plano, TX (US); April Ryan Hilton, Carrollton, TX (US); Jeffrey D Hilton, Carrollton, TX (US); Jessica B Hipp, Temple, NH (US); Zachary Nolan Belt, Plano, TX (US)

(*) Notice: Subject to any disclaimer, the term of this patent is extended or adjusted under 35 U.S.C. 154(b) by 412 days.

(21) Appl. No.: 16/929,272

(22) Filed: Jul. 15, 2020

(65) Prior Publication Data

US 2021/0021972 A1 Jan. 21, 2021

Related U.S. Application Data

(60) Provisional application No. 62/876,021, filed on Jul. 19, 2019.

(51) Int. Cl.
*H04W 4/38* (2018.01)
*H04W 4/029* (2018.01)

(52) U.S. Cl.
CPC .............. *H04W 4/38* (2018.02); *H04W 4/029* (2018.02)

(58) Field of Classification Search
CPC .......... G05B 2219/25062; G06T 17/00; G06Q 10/06; H04L 12/28; H04L 67/12; H04L 67/125; H04W 4/02; H04W 4/33; H04W 4/029; H04W 4/38; H04W 4/80; H04W 24/10; H04W 52/0206; H04W 52/0235; H04W 64/00; H04W 72/04; H04W 72/08; H04W 72/12; H04W 74/08
See application file for complete search history.

(56) References Cited

U.S. PATENT DOCUMENTS

| | | | |
|---|---|---|---|
| 6,972,682 | B2 | 12/2005 | Lareau et al. |
| 6,977,612 | B1 | 12/2005 | Bennett |
| 7,683,787 | B2 | 3/2010 | Czyszczewski et al. |
| 7,750,811 | B2 | 7/2010 | Puzio et al. |
| 7,768,393 | B2 | 8/2010 | Nigam |

(Continued)

FOREIGN PATENT DOCUMENTS

| | | |
|---|---|---|
| WO | 2017111824 A1 | 6/2017 |
| WO | 2019133048 A1 | 7/2019 |

OTHER PUBLICATIONS

PCT/US21/41595; International Search Report; Date: Oct. 1, 2021; by: Authorized Officer Shane Thomas.

(Continued)

*Primary Examiner* — Christopher T Wyllie
(74) *Attorney, Agent, or Firm* — Caldwell Intellectual Property Law

(57) ABSTRACT

A system for wireless physical condition instruction generation includes a portable computing device in communication with a wireless receiver, the portable computing device designed and configured to receiving a first wireless signal from at least transmitter located at a subject device, wherein the first wireless signal identifies the subject device, determining a current device status of the subject device, generate at least a physical condition instruction regarding the subject device, determine that the at least a physical condition instruction has been performed, and update the current device status.

20 Claims, 4 Drawing Sheets

(56) References Cited

U.S. PATENT DOCUMENTS

| | | | |
|---|---|---|---|
| 7,782,208 B2 | 8/2010 | Kennedy | |
| 7,898,388 B2 | 3/2011 | Ehrman et al. | |
| 8,130,096 B2 | 3/2012 | Monte et al. | |
| 8,373,562 B1 | 2/2013 | Heinze et al. | |
| 8,378,815 B1 | 2/2013 | McNulty et al. | |
| 8,460,103 B2* | 6/2013 | Mattice | G07F 17/32 463/16 |
| 8,538,838 B2 | 9/2013 | Doyle, III | |
| 9,642,112 B2 | 5/2017 | Costa | |
| 9,881,267 B2 | 1/2018 | Adams et al. | |
| 10,200,952 B2 | 2/2019 | Lin et al. | |
| 2003/0234763 A1* | 12/2003 | Hejza Litwiller | G06F 3/167 345/156 |
| 2004/0100376 A1* | 5/2004 | Lye | A61B 5/411 600/300 |
| 2005/0128257 A1* | 6/2005 | Amemiya | B41J 2/17543 347/84 |
| 2005/0171876 A1 | 8/2005 | Golden | |
| 2006/0067286 A1 | 3/2006 | Cornett | |
| 2006/0189278 A1* | 8/2006 | Scott | H04M 1/72475 455/90.3 |
| 2007/0156414 A1* | 7/2007 | Akhtar | G06Q 30/02 340/540 |
| 2009/0003578 A1* | 1/2009 | Jain | H04M 3/42391 379/211.01 |
| 2011/0043373 A1* | 2/2011 | Best | G01S 1/68 340/8.1 |
| 2012/0075072 A1* | 3/2012 | Pappu | H04B 5/24 340/10.1 |
| 2012/0252501 A1 | 10/2012 | Smith et al. | |
| 2012/0318697 A1* | 12/2012 | Stern | B65D 21/0233 206/514 |
| 2013/0106572 A1* | 5/2013 | McGinn | G06Q 30/02 340/5.73 |
| 2015/0141043 A1* | 5/2015 | Abramson | H04W 4/12 455/456.1 |
| 2015/0201181 A1* | 7/2015 | Moore | H04N 13/239 348/47 |
| 2015/0302774 A1* | 10/2015 | Dagar | G06F 3/04886 345/173 |
| 2015/0324646 A1* | 11/2015 | Kimia | G01C 21/3602 |
| 2016/0085565 A1* | 3/2016 | Arcese | H04L 63/0861 726/7 |
| 2018/0151089 A1* | 5/2018 | Roark | G09B 21/007 |
| 2018/0321045 A1* | 11/2018 | Belt | A61H 3/061 |
| 2018/0322376 A1 | 11/2018 | Henry et al. | |
| 2018/0338815 A1 | 11/2018 | Beaudry | |
| 2018/0370277 A1* | 12/2018 | Kjellander | B44C 5/0461 |
| 2019/0094841 A1* | 3/2019 | Denayer | G05B 19/41805 |
| 2019/0116478 A1 | 4/2019 | Wesby | |
| 2019/0187680 A1* | 6/2019 | Cella | H04L 1/1874 |
| 2020/0234554 A1* | 7/2020 | Rehfeld | G08B 29/188 |
| 2021/0021972 A1* | 1/2021 | Belt | H04W 4/029 |

OTHER PUBLICATIONS http://ieeexplore.ieee.org/stamp/stamp.jsp?tp=&arnumber=7566196&isnumber=7566075 on Apr. 25, 2019.
http://ieeexplore.ieee.org/stamp/stamp.jsp?tp=&arnumber=6095483&isnumber=6112276 on Apr. 25, 2019.
https://dl.acm.org/citation.cfm?id=1352811 on Apr. 25, 2019.
http://www.wisetrack.com/asset-tracking-software/ on Apr. 25, 2019.
http://www.wisetrack.com/mobile-asset-tracking/ on Apr. 25, 2019.

* cited by examiner

SYSTEMS AND METHODS FOR WIRELESS PHYSICAL CONDITION INSTRUCTION GENERATION

This application claims the benefit of priority of U.S. Provisional Patent Application Ser. No. 62/876,021, filed on Jul. 19, 2019, and titled "SYSTEMS AND METHODS FOR WIRELESS PHYSICAL CONDITION INSTRUCTION GENERATION," which is incorporated by reference herein in its entirety

FIELD OF THE INVENTION

Background

Devices, such as mechanical apparatuses needed for a given objective, which are located with some degree of physical dispersion, generate communication and data processing challenges, particularly where instructions pertaining to physical conditions of such devices are concerned. Current data processing and communication solutions do not adequately keep relevant data current, often rendering conferred information useless or misleading.

SUMMARY OF THE DISCLOSURE

In an aspect, a system for wireless physical condition instruction generation includes a portable computing device in communication with a wireless receiver, the portable computing device designed and configured to receiving a first wireless signal from at least transmitter located at a subject device, wherein the first wireless signal identifies the subject device, determining a current device status of the subject device, generate at least a physical condition instruction regarding the subject device, determine that the at least a physical condition instruction has been performed, and update the current device status.

In another aspect, a method of wireless physical condition instruction generation includes receiving, at a portable computing device, a first wireless signal from at least a first transmitter located at a subject device, wherein the first wireless signal identifies the subject device. The method includes determining, at the portable computing device, a current device status of the subject device. The method includes generating, by the portable computing device, at least a physical condition instruction regarding the subject device. The method includes determining, by the portable computing device, that the at least a physical condition instruction has been performed. The method includes updating, by the portable computing device, the current device status.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

Embodiments described in this disclosure ensure currency of data pertaining to disparately placed devices using wireless communication to update and/or verify such data. Acquisition of a wireless signal from a transmitter located at a subject device may be used to verify current status data and/or to modify it by reference to sensor feedback, additional wireless signal receptions, and/or user-supplied corrections. Instructions for performance of physical condition instructions such as repairs or component replacement may be acquired from remotely connected devices and provided at a user interface; performance may in turn be verified using further signal reception or other data acquisition. Use of near-field communication may ensure strict localization, furnishing greater rigor. This may aid users, including users with visual impairment or other disabilities, in locating, tracking, operating, and servicing devices and/or components of devices, as well as tracking and following recommended maintenance schedules.

Figure 1:
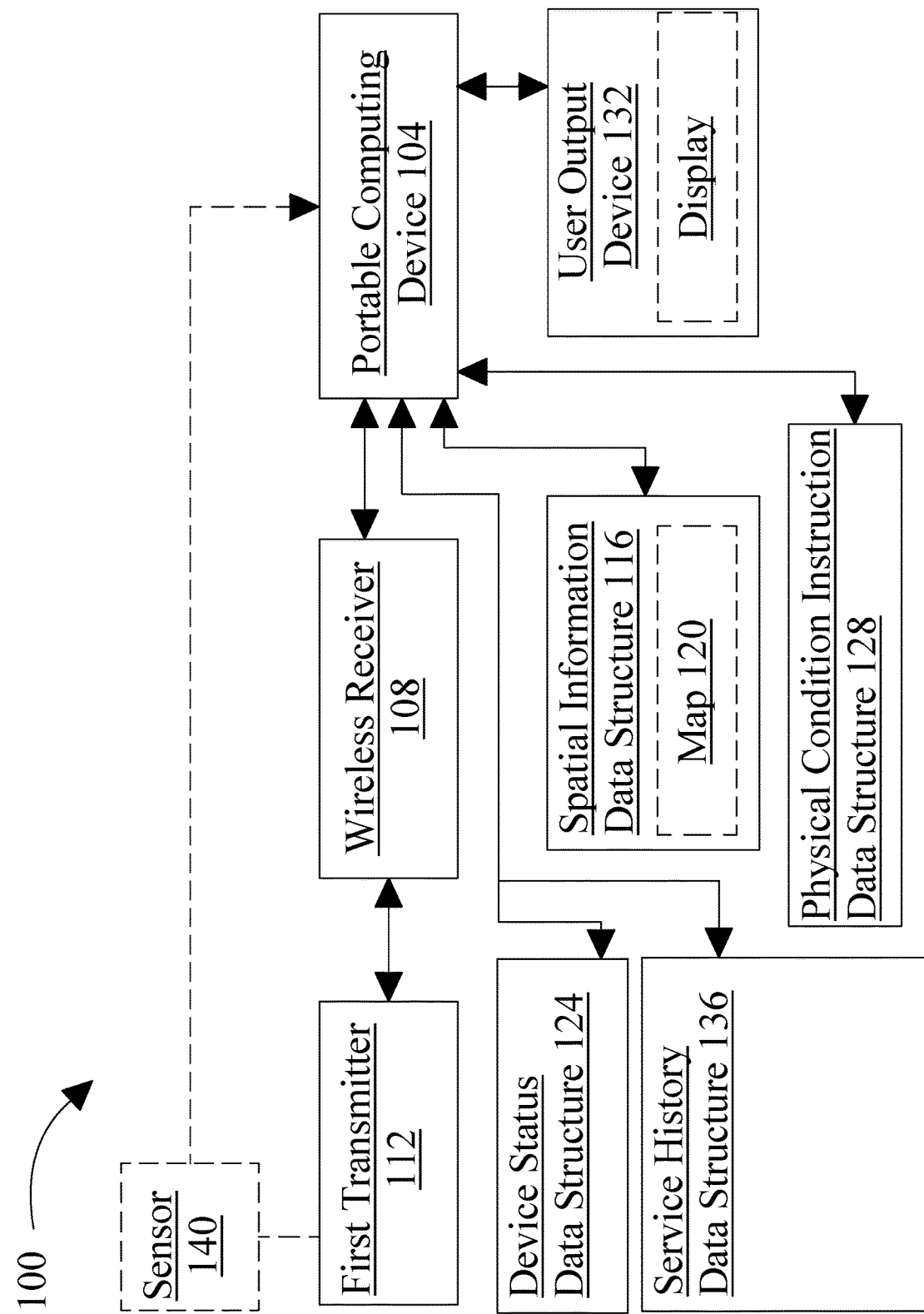
FIG. 1 is a block diagram illustrating an exemplary embodiment of a system for wireless physical condition instruction generation.

Referring now to FIG. 1, an exemplary embodiment of a system 100 for wireless physical condition instruction generation is illustrated. System 100 includes a portable computing device 104. Portable computing device 104 may be any computing device as described and defined in this disclosure, including without limitation a microcontroller, microprocessor, digital signal processor (DSP) and/or system on a chip (SoC) as described in this disclosure. Portable computing device 104 may interface or communicate with one or more additional devices as described below in further detail via a network interface device. Network interface device may be utilized for connecting portable computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Portable computing device 104 may be any computing device that may be carried on the person of a user. Portable computing device 104 may include, without limitation, a mobile device such as a mobile phone, smartphone, tablet, or personal digital assistant, or may be incorporated in a special-purpose device having features as described in further detail in this disclosure.

Still referring to FIG. 1, portable computing device 104 may be in communication with a wireless receiver 108, where "in communication" signifies ability to send signals to, and receive signals from, the wireless receiver 108, either directly or via an intermediate device. For instance, and without limitation, wireless receiver 108 may be incorporated in an additional portable computing device such as a user mobile phone, smartphone, tablet, personal digital assistant, and/or any other computing device, portable computing device 104, receiver, or device as described anywhere in this disclosure, which may connect to portable computing device 104 via a network, which may be a local area network, a wide area network, the Internet, or any other network passing electronic wired and/or wireless communication between devices. Portable computing device 104 may be electronically connected to wireless receiver 108, and/or in wireless communication with wireless receiver 108; portable computing device 104 may perform wireless communication with wireless receiver 108 using any suitable protocol, including without limitation BLUETOOTH protocols as described above. Wireless receiver 108 may be incorporated in portable computing device 104.

Continuing to refer to FIG. 1, wireless receiver 108 may have an antenna. Wireless receiver 108 may include a wireless interrogator; in other words, an antenna of wireless receiver 108 may be capable of inducing a current in an antenna of a passive transmitter through methods and/or technologies including without limitation magnetic coupling, capacitive coupling, or other means suitable for near-field communication (NFC) and/or passive radio frequency identification (RFID). Wireless receiver 108 may be able to receive a signal transmitted by one or more first transmitters 112 as described below using an antenna. In some embodiments, wireless receiver 108 may be able to transmit as well as receive signals. Wireless receiver 108 may include a transceiver, which both sends and receives signals; the transceiver may be a system on a chip, including processing, memory, or any other functions together in a single integrated circuit. Transceiver may exchange signals according to existing protocols, such as the BLUETOOTH protocol promulgated by Bluetooth SIG, Inc. of Kirkland, Washington. Transceiver may further implement a "beacon" protocol; as a non-limiting example, the beacon protocol may be implemented using the IBEACON protocol produced by Apple, Inc. of Cupertino, Calif., the EDDYSTONE protocol produced by Google, Inc. of Mountain View, Calif., or a similar protocol. Antenna may include a plurality of antennas; for example, and without limitation, antenna may include a first antenna that transmits interrogation signal, and a second antenna that receives return signal. Antenna may include multiple antennas that receive and/or transmit signals; for instance, antenna may include antennas facing in various directions for transmitting interrogation signals and receiving return signals to and from various directions simultaneously. Similarly, wireless receiver 108 may include both an antenna for receiving from and/or transmitting signals to a first transmitter 112 and a transceiver that may be used for communicating with a mobile computing device, for instance as described below. Wireless receiver 108 may include any device capable of or configured to receive any signal in the form of electromagnetic radiation, including without limitation visible spectrum light, infrared light, radio waves, or signals in any other portion of the electromagnetic spectrum, capacitive or magnetic inductance, or any other form of wireless communication that may be established between two electronic devices or components.

Still referring to FIG. 1, wireless receiver 108 may include a driver circuit. A "driver circuit," as used in this disclosure, is an electric circuit, electrically coupled to antenna, that processes electric signals induced in antenna by wireless signals and processes the electric signals. In other words, driver circuit may be any electrical circuit configured to wirelessly receive a signal from a first transmitter 112, as described in further detail below, via antenna. Where wireless receiver 108 includes a wireless interrogator, driver circuit may further be configured to wirelessly transmit an interrogation signal via the antenna to a passive transponder; the interrogation signal may provide electrical power to the passive transponder. Driver circuit may further be configured to wirelessly receive a return signal from the transponder via the antenna.

With continued reference to FIG. 1, driver circuit may include analog components, digital components, or both. For instance, driver circuit may include one or more filters (not shown), such as a Butterworth filter, a Chebyshev filter, a band filter, or the like, to filter out noise or selectively receive particular frequencies or ranges of frequencies. Driver circuit may include one or more amplifiers. Driver circuit may include a logic circuit, or a circuit including at least one digital circuit element. Logic circuit may be hardwired; for instance, logic circuit may include logic hardware circuit components such as logic gates, multiplexors, demultiplexors, programmable circuits such as field-programmable arrays, read-only memory, and the like. Logic circuit may include memory, which may be any memory as described in this disclosure. Logic circuit may include a computing device as described in this disclosure. In some embodiments, the wireless receiver 108 includes a computing device; the computing device may be any computing device as described in this disclosure. As a non-limiting example, the wireless receiver 108 may be a mobile computing device such as a mobile phone, "smartphone," or tablet; wireless receiver 108 may be incorporated in a mobile computing device. Wireless receiver 108 may be incorporated in a special-purpose device, such as handheld device or device mounted on a finding aid that, as a non-limiting example, is wirelessly or otherwise coupled to a mobile or portable computing device 104. Computing device may be a microcontroller.

Still referring to FIG. 1, wireless receiver 108 may include a power source. Power source may include a power storage device; the power storage device may include a battery. Power storage device may include a capacitor; for instance, the power storage device may include an ultra-capacitor. Power storage device may include a magnetic power storage device, such as a device that incorporates an inductor. In some embodiments, power source includes a photovoltaic device; the photovoltaic device may be any device that converts light to electric power. Power source may include power provided by an electrical network, for example including electric power accessed via a wall-plug; the electrical power may be alternating current "mains" power, or power generated by solar panels, wind turbines. Wireless receiver 108 may charge wirelessly; for instance, the wireless receiver 108 may charge inductively. Wireless receiver 108 may include an inertial power source that generates mechanical or electrical power from movement of wireless receiver 108, including without limitation an inertial power source that generates power from walking or swinging a cane on which inertial power source is mounted. Wireless receiver 108 may include an optical capture device, such as a camera, optical scanner, laser scanner, or the like.

With continued reference to FIG. 1, wireless receiver 108 is configured to receive a signal from at least a first transmitter 112. In some embodiments, where at least a first transmitter 112 includes a passive transmitter as described in further detail below, wireless receiver 108 may receive the signal by producing an interrogation signal using an interrogator, and receiving the signal generated by the passive transmitter in return. In other embodiments, where at least a first transmitter 112 includes an active transmitter as set forth in further detail below, wireless receiver 108 listens for the transmission frequency of at least a first transmitter 112 and inputs the signal upon receiving the signal output by at least a first transmitter 112. Wireless receiver 108 may exchange signals with at least a first transmitter 112; for instance, wireless receiver 108 may transmit a query to at least a first transmitter 112 and receive data in response to the query. Wireless receiver 108 may similarly receive a signal from a second transmitter or from additional transmitters situated in a navigable space, as described in further detail below. Wireless receiver 108 may be configured to receive content data from at least a first transmitter 112 or a second transmitter. Wireless receiver 108 may be configured to receive product data from at least a first transmitter 112 or a second transmitter.

Alternatively, or additionally, and still referring to FIG. 1, wireless receiver 108 may have a code reader. In some embodiments, a code reader may be any device capable of reading a visual code such as a UPC laser-scanned code or a quick read ("QR") code. In some embodiments, the code reader is a laser scanner. In other embodiments, the code reader is an optical device such as a camera; for instance, where wireless receiver 108 is a mobile device such as a mobile phone or tablet, or is coupled to such a device, the code reader may be the camera of the mobile device. The mobile device may be configured to input a QR or UPC code using the camera and then extract the data contained in the code using software. In any embodiment of methods, systems, and/or devices described herein in which wireless receiver 108 receives a return signal including a unique identifier and processes that return signal, wireless receiver 108 may similarly obtain the unique identifier by way of a code reader and process the unique identifier in a like manner. In an embodiment, first transmitter 112 may include a QR code and/or UPC code, or other optical code; receiving signal may include scanning an optical code.

With continued reference to FIG. 1, system 100 may include and/or communicate with at least a first transmitter 112. At least a first transmitter 112 may include any device that outputs a signal using electromagnetic radiation; the signal may be sent using any frequency usable in communication, including without limitation radio waves, microwaves, infrared waves, and visible light. At least a first transmitter 112 may include an antenna. At least a first transmitter 112 may include a passive transmitter, such as those used for passive RFID and/or near field communication NFC tags or devices. In some embodiments, passive transmitter includes an antenna in which electric current is induced by magnetic coupling from an antenna, such as antenna of wireless receiver 108; the induced electric current may power the passive transmitter, which may use additional circuitry such as a logic circuit to analyze the signal and generate a response signal. Logic circuit may be any logic circuit as described above regarding driver circuit. At least a first transmitter 112 may output signal by modifying electromagnetic radiation using means other than an antenna. For instance, at least a first transmitter 112 may absorb and/or reflect ambient or directed electromagnetic radiation in visible or other spectra; first transmitter 112 may emit and/or reflect such electromagnetic radiation in spectrally altered pattern that may be detected using a code reader, antenna, or other device or component of wireless receiver 108. This may be accomplished, in a non-limiting example, using one or more pigments disposed on a surface of first transmitter 112; one or more pigments may include, as a non-limiting example, two or more contrasting pigments, which may be provided in a one-dimensional or two-dimensional distribution. Non-limiting examples of such pigmented arrangements may include quick-read codes and/or universal product codes, as rendered on physical objects, electronic displays, and the like.

Still referring to FIG. 1, response signal may be output by the same antenna. The response signal may be output by an additional antenna; in other words, as described above for wireless first transmitter 112, antenna may include multiple antennas. In some embodiments, the passive transmitter has a plurality of antennas to enable the first transmitter 112 to capture the signal optimally from a plurality of angles. The signal from the interrogator may contain no information, functioning solely to activate the passive transmitter. In other embodiments, the signal from the interrogator contains information that circuitry in the passive transmitter processes.

Continuing to refer to FIG. 1, at least a first transmitter 112 may include an active transmitter. Active transmitter may be a transmitter having a power source other than an interrogation signal; power source may be any power source as described above. Active transmitter may use the antenna to broadcast a signal periodically. Active transmitter may use the antenna to listen for incoming signals and transmit in response to a detected signal. Active transmitter may perform both actions; for instance, active transmitter may periodically transmit a first signal, and also transmit one or more second signals in response to signals at least a first transmitter 112 receives. At least a first transmitter 112 may include a transceiver, which may be any transceiver as described above. At least a first transmitter 112 may include a beacon using any beacon protocol as described above.

Still referring to FIG. 1, at least a first transmitter 112 may include a memory. Memory may be any memory as described in this disclosure. In some embodiments, memory is read-only. In other embodiments, memory may be writable. The writable memory may require authentication; for instance, the writable memory may be writable only given a password, identifier, key, or other data indicating that the device that will be modifying the memory is authorized. Memory may include any combination of the above; for instance, memory may include a read-only section. Memory may include a writable section with limited access. Memory may include a writable section with general access, to which any user may be able to write data. Memory may include the read-only section and the generally writable section, or the limited access writable section and the generally writable section, or the read-only section and the limited access section. The limited access section may be limited to users of the system 100, or in other words may be generally writable, but only to users of the system 100, who may have the requisite access codes as a result of joining the system 100 as users; the users may alternatively be granted the access codes by the system 100 to update information on at least a first transmitter 112 only when authorized by the system, and otherwise be unable to update the memory; in this way, the system 100 may be able to update information on at least a first transmitter 112 memory efficiently by way of the receiver while maintaining security against misuse of the memory. In some embodiments, preventing users from being able to write over memory enables the memory to be free from intentional or unintentional corruption or inaccuracy, and enables the system 100 to ensure that certain information is always available to users of at least a first transmitter 112. In some embodiments, writable sections enable the system 100 itself or users of the system 100 to correct, augment, or update information as described in further detail below.

Continuing to refer to FIG. 1, at least a first transmitter 112 is configured to transmit a signal. Signal may be a return signal in response to a prompt by another wireless communication device, including without limitation wireless receiver 108. Signal may be a return signal in response to interrogation by an interrogator included in another wireless communication device, including without limitation wireless receiver 108. Signal may be any wirelessly transmitted signal, including without limitation any signal transmitted through electromagnetic radiation, magnetic coupling, capacitive or other electronic coupling, or any other wireless means. Signal may include an identifier; identifier may identify at least a first transmitter 112, and/or a product. Signal may include a resource locator, such as a uniform resource locator (URL), which may without limitation direct a device such as portable computing device 104 to a network location or other electronic communication-enabled resource where data may be retrieved and/or updated according to any method, method step, or system configuration described in this disclosure. Signal may include a function call, which may cause a receiving device such as without limitation portable computing device 104 and/or a device in communication therewith to execute a computer program, which may include any hardware, software, or combined program as described in this disclosure. At least a first transmitter 112 may identify a specific location within a navigable space as described in further detail below; specific location may include, without limitation, a location to which at least a first transmitter 112 is attached or affixed. Specific location may be static. For example, a first transmitter 112 of at least a first transmitter 112 may identify a specific location on a specific shelf in a store; products may be switched out at that location and a reference to a database, which may include any data structure as described in this disclosure, may identify which product is then stored at that location, for instance pursuant to or in reflection of a planogram update as described in further detail below. Identification of which product is stored at which location may be updated first, followed by movement of the product to the new location. In an embodiment, each first transmitter 112 of at least a first transmitter 112 may have, store, and/or transmit a unique identifier. Identifier may take the form of a unique identifier that uniquely corresponds to at least a first transmitter 112 for the purposes of the system 100; this may be accomplished using methods including but not limited to Globally Unique Identifiers (GUIDs), Universally Unique Identifiers (UUIDs), which may be identifiers including numbers generated according to a standard which makes the chances of another UUID or GUID being identical to the instant identifiers negligible to the point of near-certain impossibility, or by maintaining a data structure, table, or database listing all first transmitter 112 identifiers and checking the data structure, table listing, or database to ensure that a new identifier is not a duplicate.

Still referring to FIG. 1, Identifier may alternatively identify a group of first transmitters 112 including or included in at least a first transmitter 112. Group of first transmitters 112 may be commonly owned; for instance, group of first transmitters 112 may all be owned by a single person or entity. Owner of a first transmitter 112 and/or group of first transmitters 112 may have exclusive ability to modify information publicly associated with first transmitters 112, where information publicly associated with first transmitters 112 includes information linked to identifier in any data structure as set forth in further detail below, or stored and transmitted by the first transmitter 112, and available to all users of portable computing devices 104 like portable computing device 104. Alternatively or additionally, rights to change publicly available information may be possessed by individuals and/or groups having particular authentication credentials or the like. Information on data structures as described herein may be organized according to owner identifiers and/or identifiers of groups of first transmitters 112; in an embodiment, this manner of organization may make retrieval of data from data structures more efficient. For instance, and without limitation, owner identifier may be linked in a data structure or table to a location or identifier of a data structure and/or database relating to that owner identifier. As a further example, a single server or remote device, as described in further detail below, may include all information and/or data structure portions or instances pertaining to a particular owner identifier. As a non-limiting example one or more first transmitters 112 of at least a first transmitter 112 may be formatted with owner identifiers in the textual element prior to provision of the one or more first transmitters 112 to the owner; alternatively or additionally a mechanism may be provided in an application or the like allowing an owner to format his or her own tags with the textual element identifying him or her as the owner. Signal may include other data in addition to identifier. In an embodiment, one or more first transmitters 112 may have identifiers of transmitter, manufacturer, and/or owner written to the transmitters and/or hardcoded thereon by manufacturer.

With continued reference to FIG. 1, data to be transmitted by at least a first transmitter 112 may be stored on at least a first transmitter 112 in any format conducive to its storage and transmission. Data may be stored in binary form; the binary storage may be any encoding of information. Data may be organized into formats such as network packets, fixed-length strings, XML, or any other form. Persons skilled in the art, upon reading the entirety of this disclosure, will be aware of many different ways in which data may be stored on at least a first transmitter 112 and/or portable computing device 104.

Still referring to FIG. 1, portable computing device 104 may be designed and configured to parse a signal received from at least a first transmitter 112 for at least a textual element. Portable computing device 104 may be designed and configured to receive first signal from at least a first transmitter 112; receiving a signal from a first transmitter 112, as described herein, may include receiving signal via receiver, as communicatively connected to portable computing device 104 as described above. For instance, a receiver connected directly, wirelessly, or via an network to portable computing device 104 may receive a signal from a first transmitter 112 via passively or actively scanning first transmitter 112, and then relay that signal to the portable computing device 104; e.g., a first user may scan or otherwise receive a signal from a first transmitter 112 using a first portable computing device 104, such as a smartphone, which may then transmit the signal, or a message based on the signal, to portable computing device 104. At least a textual element may include any datum or data that may be rendered as text, including without limitation numerical text, as any character or string of characters in any written language, as any punctuation, diacritical symbols, or other markings associated with any form of written text, and the like. Textual data may include a unique identifier, a product identifier, an identifier associated with a particular location in a navigable space, or the like; persons skilled in the art, upon reviewing the entirety of this disclosure, will be aware of various elements of data that may be contained in textual data consistently with this disclosure.

Figure 2:
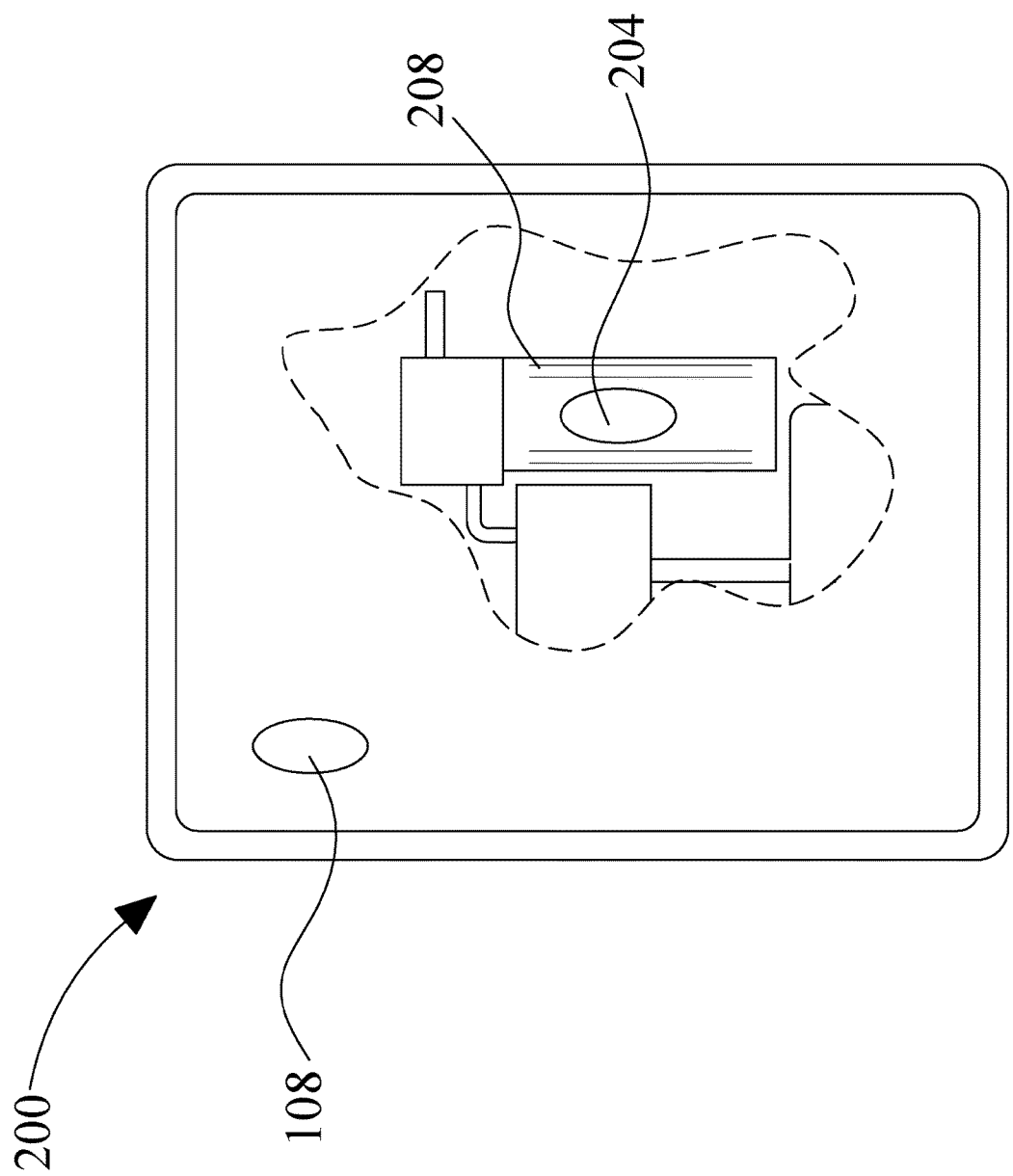
FIG. 2 is a schematic diagram illustrating an exemplary embodiment of a subject device.

Referring now to FIG. 2, at least a first transmitter 112 may be located at a subject device 200. A "subject device," as used in this disclosure, is a device with regard to which at least a physical condition instruction is generated according any method, method step, and/or system embodiments described in this disclosure. A subject device 200 may include a piece of moveable and/or stationary equipment, such as without limitation a consumer or industrial appliance, an element of machinery, a vehicle, or the like. A subject device 200 may include equipment usable for preparation of food or beverages, such as brewing, cooking, fermenting, or other equipment. A subject device 200 may include a household or institutional appliance or element of equipment such as a refrigerator, stove, heating, venting, and air conditioning (HVAC) device, a lawnmower, a snowblower, or the like. A subject device 200 may include a manufacturing machine and/or element of equipment such as a computer numerical control (CNC) machine, a rapid prototyping and/or additive manufacturing machine, a factory machine, a manufacturing robot, a device for moving and/or manipulating workpieces and/or other items under construction such as without limitation conveyor belts, robot arms, fixtures, or the like, and/or transport vehicles for use within and/or between manufacturing facilities. A subject device 200 may include a warehouse operation device such as a robotic device and/or system for storage and/or retrieval of items in a warehouse, vehicles, conveyor belts, or other transport equipment for use in warehouses, or the like. A subject device 200 may include construction equipment such as a crane, backhoe, excavator, pile driver, hydro-vac excavation device, or the like. A subject device 200 may include a vehicle such as a transport and/or delivery vehicle.

Still referring to FIG. 2, a subject device 200 may have one or more components 208 requiring replacement or otherwise subject to physical condition instructions as described in further detail below; as a non-limiting example, a coffee brewing device may include filters, gaskets, or the like that require periodic replacement. Such a component 208 may include and/or constitute a subject device 200 in its own right; for instance, a radiator in a vehicle may require periodic fluid checks and/or cleaning and may also eventually be replaced with a new radiator. A subject device 200 may include a consumer product. A subject device 200 may include an accessibility assistive device, which may include any device useable to aid a person with a physical and/or mental disability in navigation of and/or interaction with an environment or items therein; examples may include white canes, hearing aids, mobility aids, wheelchairs, and the like. A subject device 200 may include a medical device. A subject device 200 may include military equipment. A subject device 200 may include military supplies. Persons skilled in the art, upon reviewing the entirety of this disclosure, will be aware of various examples for subject devices 200 and/or components 208 thereof as used in this disclosure.

With continued reference to FIG. 2, at least a first transmitter 112 may be located at subject device 200; location at subject device 200 may include, without limitation, attachment to subject device 200, location adjacent to subject device 200, and/or incorporation in subject device 200. For instance, and without limitation, at least a first transmitter 112 may be embedded in subject device 200 and/or a component 208 thereof; it may, for instance, be infeasible to remove at least a first transmitter 112 from subject device 200 without damaging and/or destroying subject device 200. As a further non-limiting example, at least a first transmitter 112 may be attached to an exterior and/or interior surface of subject device 200; attachment may include attachment using fasteners such as screws, bolts, studs, press-fasteners such as hook-and-loop fasteners, buckles and/or zip-ties. Attachment may include adhesion.

Still referring to FIG. 2, a second wireless transmitter may be attached to and/or located at one or more components 208 of subject device 200. Second wireless transmitter may include any device and/or devices usable as at least a first wireless transmitter, as described above. Second wireless transmitter may be located at and/or attached to a component 208 according to any means or techniques suitable for location of at least a first transmitter 112.

Referring again to FIG. 1, a spatial information data structure 116 may be included in and/or communicate with system. Spatial information data structure 116 may include any data structure describing locations of subject device 200 and/or devices, at least a first transmitter 112, and/or one or more additional and/or second transmitters 204 in a navigable space. A "navigable space," as used in this disclosure, is any space where a subject device 200 may be located, including any outdoor or indoor space. A navigable space may include without limitation a corridor, a room, an interior or exterior retail space, a restaurant dining area, a restroom, a trail, a parking lot, a road, a sidewalk, a park, or a vehicle such as a bus, train, aircraft, boat, ship, space vehicle, or space station. A navigable space may contain other navigable spaces; as a non-limiting example, first navigable space may be a restaurant, within which a bathroom may be a second navigable space and a dining area may be a third navigable space. Further continuing the example, a toilet stall within the bathroom may be a fourth navigable space.

Still referring to FIG. 1, spatial information data structure 116 may include or be implemented with any database, datastore, and/or data structure suitable for use in storage and/or retrieval of data. Spatial information data structure 116 may be implemented, without limitation, as a relational database, a key-value retrieval database such as a NOSQL database, or any other format or structure for use as a database that a person skilled in the art would recognize as suitable upon review of the entirety of this disclosure. Spatial information data structure 116 may alternatively or additionally be implemented using a distributed data storage protocol and/or data structure, such as a distributed hash table or the like. Spatial information data structure 116 may include a plurality of data entries and/or records as described above. Data entries in a spatial information data structure 116 may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in spatial information data structure 116 may store, retrieve, organize, and/or reflect data and/or records as used herein, as well as categories and/or populations of data consistently with this disclosure. Spatial information data structure 116 may include or link to an electronic or virtual map 120. Virtual map 120 may contain dimensions of a navigable space. Virtual map 120 may contain location of at least a first transmitter 112 within a navigable space. Virtual map 120 may contain location of a second transmitter 204 within a navigable space. Virtual map 120 may contain locations of architectural features within the navigable space. Virtual map 120 may contain locations of user features within the navigable space.

With continued reference to FIG. 1, virtual map 120 may include one or more coordinate systems to aid in orientation and location detection and route calculation. The coordinate system may include a Global Coordinate System (GCS); in some embodiments, the GCS is a coordinate system orienting and locating navigable space, users, and features to a global set of axes. The global axes may be directional axes used to navigate the surface of the Earth, such as latitude and longitude. For example, a first global axis, which may be labeled the Y axis, may be oriented north-south, with north being the direction of the positive Y axis and south the direction of the negative Y axis. Likewise, a second axis, which may be the X axis, may be oriented east-west, with east in the direction of the positive X axis and west in the direction of the negative X axis. Up and down may correspond to a third axis, which may be the Z axis, with up positive for the Z axis and down negative for the Z axis.

Still referring to FIG. 1, in some embodiments, coordinates may include a User Coordinate System (UCS) for each navigable space. The UCS for a given navigable space may have an origin point at a fixed location within the navigable space; for instance the origin point may be located at the strike or handle side of the entrance door of a room. The UCS may have three axes that span three dimensions. As a non-limiting example, a first axis, which may be the Y axis of the UCS, may be oriented in a first horizontal direction. In some embodiments, the first horizontal direction is a direction that is relatively simple to determine from location of the origin and the physical characteristics of the surrounding features; for instance, where the origin is located at a door in the navigable space or at a wall of the navigable space, the Y axis may be perpendicular to the door or wall. The direction along the Y axis projecting into the navigable space may be positive. Further continuing the example, the UCS may include a second axis, which may be the X axis, in a second horizontal direction such that the Y and X axes together span the horizontal plane; the X axis may be perpendicular to the Y axis. The X axis may be aligned in a direction determinable by the physical characteristics of the features near the origin of the UCS; for instance, where the Y axis is perpendicular to a wall or door, the X axis may be parallel to the wall or door. The UCS may include a third axis, which may be the Z axis, such that the Y, X, and Z axes together span three dimensions; the Z axis may be perpendicular to the Y and X axes, and thus vertical. In some embodiments, up is in the positive direction on the Z axis. Each UCS may have a specific relationship to the GCS that can be transposed when appropriate.

Continuing to refer to FIG. 1, in some embodiments, where one of at least a first transmitter 112 has a fixed location, at least a first transmitter 112 with the fixed location has its own UCS. The first transmitter 112 location may be the UCS origin. The UCS axes may be selected as described above. For instance, perpendicular to and into the face of the (wall mounted or feature mounted) fixed first transmitter 112 may be a positive Y axis communicated to the user as "straight ahead". A positive X axis may be 90 degrees to the right of the Y axis and may be communicated to the user as to the right. The first transmitter 112 UCS may have a specific relationship to its parent UCS and thus to the GCS. In some embodiments, the communications to the user are for the user when facing the first transmitter 112 (e.g., straight ahead, to the left, to the right turn around and proceed).

Still referring to FIG. 1, in some embodiments, the regional descriptive data is stored using Building Information Modeling (BIM). In some embodiments, in a BIM, not only physical attributes such as location and size are stored, but any information about any feature (or space) is stored, including any features as described above, such as without limitation architectural features, free-standing user features, user features, and the like. BIM is a common term in the CAD world of the construction industry. As a non-limiting example, BIM data for a give user feature 212, architectural feature, or navigable space may include the X, Y and Z coordinates in a UCS, as described above. In some embodiments, this allows the calculation of distance to any other features UCS, even if that other feature is not in virtual map 120. The BIM data may include the orientation of the feature, with regard to the UCS, where orientation describes the tilt of a feature relative to a particular UCS plane. The BIM data may include a path tree connecting the feature to one or more other features as described above. Path tree may or may not describe a shortest distance between objects; for instance, path tree may describe a path to avoid obstacles such as walls or furniture. There may also be multiple paths to provide alternate routes to avoid features such as stairs. The BIM data may include attributes of the feature, including without limitation the name and type of space (or subspace) in which the feature is located, the type of feature (e.g. toilet, sink, dryer, checkout counter, elevator), the operation (e.g. flush valve, nozzle, motion sensor, location of operation (e.g., top of countertop, wall, fixture mounted, free standing), material covering surfaces (e.g. tile, carpet, stone, wood, or paint), color or distinguishing marks, or floors to which an elevator will travel, manufacturer information including warrantees, materials, methods used to produce, specifications, cleaning instructions, operation, replacement parts, and the like. BIM attributes may similarly be stored in an object-oriented data structure so that the attributes reference other databases and/or data structures. Part or all of virtual map 120 may be stored at portable computing device 104 or at a remote device; a relevant portion of virtual map 120 and/or regional descriptive data may be downloaded as needed, for instance prior to navigation to a particular location, prior to performance of a particular instruction and/or set of instructions, or the like.

With continued reference to FIG. 1, spatial information data structure 116 may include a table or similar structure linking unique identifier to a location in virtual map 120. Spatial information data structure 116 may include a representation of navigable space. Representation of data in navigable space may itself include a plurality of data elements that define specific spaces, such as departments, aisles, shelves/display structures, locations on shelves/display structures, or the like. This may be accessed by arrangement and traversal of a tree, or other data structure enabling recursive, linked, or serial enumeration of data structures. If portable computing device 104 determines a user's current location in any navigable space within any parent navigable space, specific information can be communicated to navigate to any other space within the parent navigable space, as all the origin points are connected according to the data representations. The representation of each navigable space may include an exit/entry point corresponding to a physical exit/entry point for the navigable space. Location of a navigable space's origin point or exit/entry point may be stored in the data representation of the parent space, or in a tree structure one node higher in the tree structure. In some embodiments, the exit/entry point of a given space must be traveled through physically to access data corresponding to the space (upon entry) or data corresponding to parent or sibling spaces (upon exit).

Continuing to refer to FIG. 1, persons skilled in the art will be aware that the elements described above may be organized in other manners than in the object form described, as data may be organized in various ways depending on the programming language, protocols, or storage methods used, and other considerations; for instance, a relational database may arrange the data corresponding to each navigable space in any manner using interrelated tables according to the dictates of efficient information storage and retrieval. Furthermore, information may be transferred from one form to another as convenient to the operation of the system; for instance, a single node in a tree structure corresponding to the navigable space most immediately occupied by the user may be stored in a at least a first transmitter 112 within that space or may be conveyed to the receiver over the network in network packet form. Furthermore, data may be stored according to any registry or other memory storage protocol within particular computing devices. Part or all of spatial information data structure 116 may be stored at portable computing device 104 or at a remote device such as a server or the like; a relevant portion of spatial information data structure 116 may be downloaded as needed, and as further described below in reference to FIG. 3.

With continued reference to FIG. 1, system may include and/or communicate with a device status data structure 124. Device status data structure 124 may include any data structure and/or component 208 thereof suitable for use as a spatial information data structure 116 as described above. Device status data structure 124 may be used by system 100 to store and/or retrieve data describing a current status of at least a subject device 200, or a plurality thereof, as described in further detail below. Device status data structure 124 may further include history of actions performed with regard to subject devices 200 and/or components 208 thereof, including actions fulfilling physical condition instructions, as set forth in further detail below.

Continuing to refer to FIG. 1, system 100 may include a physical condition instruction data structure 128; physical condition instruction data structure 128 may include any data structure and/or component 208 thereof suitable for use as a spatial information data structure 116 as described above. Physical condition instruction data structure 128 may be used for storage and/or retrieval of one or more physical condition instructions. A "physical condition instruction," as used in this disclosure, includes an instruction to perform one or more actions evaluating, affecting, and/or modifying a physical condition of a subject device 200; physical condition instructions may include, without limitation, instructions to replace components 208, instructions to perform maintenance activities such as oil changes, tune-ups, checking fastenings, joints, and/or couplings, or any other service and/or maintenance process that may occur to a person skilled in the art upon reviewing the entirety of this disclosure.

Still referring to FIG. 1, system 100 may include a user output device 132. User output device 132 may include a display; the display may be any display as described in this disclosure. The display may be the display of a mobile device such as a smartphone or tablet. User output device 132 may include an audio output device, such as a speaker, headphones, or a wireless headset such as those typically paired to a mobile device. User output device 132 may include a tactile output device. In some embodiments, tactile output device is a device that outputs information that is intelligible using the sense of touch. Tactile output device may include a haptic output device such as a vibrator of a mobile device such as a smartphone, cellular phone, or tablet. In some embodiments, tactile output device produces patterns having geometric forms that are intelligible to the user using the sense of touch; for instance, tactile output device may output letters in braille using a set of retractable pins or bumps that can be extended and retracted to form braille characters, similarly to devices used with screen readers. User output device 132 may be coupled to a mobile device; for instance, where portable computing device 104 includes a mobile device, user output device 132 may be coupled to the same mobile device. User output device 132 may be incorporated wholly or in part in a mobile device; for instance, user output device 132 may include the display and speakers of the mobile device, as well as a tactile output device coupled to the mobile device. User output device 132 may be coupled directly to wireless receiver 108 and/or portable computing device 104 or may communicated with wireless receiver 108 and/or portable computing device 104 via a network; user output device 132 may be incorporated in or include a computing device and/or any element thereof, including without limitation a processor, wireless or wired communication input/output devices, navigation facilities, and the like. User output device 132 is configured to receive data from portable computing device 104; data may be received from portable computing device 104 by any suitable electronic or wireless means. User output device 132 is configured to provide the received data to the user. In some embodiments, providing data signifies presenting the data to the user in a form in which the user can understand the data; for instance, if the user has some visual impairment but is capable of reading large type or similarly accentuated directional features such as large directional arrows, providing data may include displaying large type on a display, such as a mobile phone or tablet screen, or displaying large symbols such as directional arrows on the display. Similarly, if the user is visually impaired but able to hear, providing data may involve presenting the data by means of an audio output device. Where the user is not able to see or hear, providing output data may include providing data using a tactile device. Providing data may also involve a combination of the above-described means; for instance, navigation instructions or the like may be presented to the user in audio form, combined with large displays of directional arrows or type, or with tactile information.

Continuing to refer to FIG. 1, portable computing device 104 may include additional components 208. For instance, portable computing device 104 may include an inertial measurement unit (IMU). IMU may be an electrical component 208 that detects the motion of the wireless receiver 108. IMU may include, an accelerometer (not shown). IMU may include a plurality of accelerometers disposed to detect acceleration in a plurality of directions; for instance, three accelerometers disposed in three directions spanning three dimensions may be able to detect acceleration in any direction in three dimensions. IMU may include one or more gyroscopes (not shown). IMU may include a plurality of gyroscopes disposed to detect rotation about a plurality of axes; for instance, three accelerometers having axes spanning three dimensions may be able to detect acceleration in any direction in three dimensions. IMU may have both accelerometers and gyroscopes. IMU may have any other component 208 or components 208 capable of detecting linear or rotational motion. In some embodiments, IMU can determine substantially precisely the direction and magnitude of motion of the wireless receiver 108 relative to an initial reference frame and location; where the wireless receiver 108 is initially stationary, IMU may enable the wireless receiver 108 to determine substantially accurately any change in orientation or position of the receiver. In other embodiments the receiver is coupled to an IMU; for instance, where the receiver is coupled to a computing device such as a smartphone or tablet, the computing device may have an IMU.

Still viewing FIG. 1, portable computing device 104 may include a navigation facility (not shown), defined as any facility coupled to the computing device that enables the device accurately to calculate the device's location on the surface of the Earth. Navigation facilities may include a receiver configured to communicate with the Global Positioning System or with similar satellite networks, as well as any other system that mobile phones or other devices use to ascertain their location, for example by communicating with cell towers. Portable computing device 104 may use beacons for navigation, for instance determining its location by direction and strength of one or more beacon signals; directional information may be received as part of beacon signals. Beacons transmitting beacon signals may be calibrated by portable computing device 104, or by multiple such devices, as set forth in further detail below. Navigational means may include a compass, which may be any device capable reporting orientation to the points of the compass (e.g. North, South, East, West, and the like) of portable computing device 104, for instance and without limitation by sensing a magnetic field of the Earth.

Continuing to view FIG. 1, system 100 may include a maintenance history data structure 136. Maintenance history data structure 136 may be implemented in any way suitable for implementation of spatial information data structure 116 as described above. In an embodiment, maintenance history data structure may be linked to and/or embodied in device status data structure 124; for instance, device status determinations as recorded in device status data structure 124 may be determined at least in part by reference to maintenance history data structure 136 or vice-versa. Maintenance history data structure 136 may list data describing a history of service, maintenance, or other actions to repair, maintain, and/or replace components of a subject device 200. Maintenance history data structure 136 may include tables, entries, or separate data structures for each service provider and/or each purveyor of subject devices 200; such tables, entries, or separate data structures may be accessible only to parties authorized to view such tables, entries, or separate data structures, which may include without limitation service provider and/or each purveyor of subject devices 200 to which such tables, entries, or separate data structures correspond. Alternatively or additionally, history of various maintenance procedures may be provided by and/or stored by one or more entities and/or organizations in independent and/or third-party data structures, which may be in communication with system 100. In operation, portable computing device 104 may compile various service records related to a single subject device 200. Portable computing device 104 may compare a compiled list of records against a checklist of items that should have been completed, for instance to keep a warranty valid, or otherwise to comply with a service, safety, and/or maintenance requirement recorded in a data structure accessible to portable computing device 104. Portable computing device 104 may compile lists of subject devices 200 having a common owner, each item having multiple disparate vendor service records compiled per subject device 200 or by vendor showing all the service records per subject device 200.

Still referring to FIG. 1, system 100 may include and/or communicate with one or more sensors 140; one or more sensors 140 may be linked to, incorporated in, and/or in communication with any component of system 100, including without limitation first transmitter 112. One or more sensors 140 may include any sensor or sensors suitable for detecting and/or measuring any physical phenomena including, without limitation, motion sensors, optical sensors, acoustic sensors, humidity sensors, temperature sensors such as without limitation thermometers, magnetic sensors such as Hall effect sensors, sensors of light and/or other electromagnetic radiation, or the like. Sensors may be attached to, linked to, or otherwise associated with a subject device 200 or other item linked to first transmitter 112. Information from a sensor 140 may be stored in memory on the sensor 140 and/or another device linked thereto; for instance, information may be stored on at least a first transmitter 112 until wireless receiver 108, portable computing device 104, and/or any other device such as an interrogator requests and/or receives that information. Information may be transmitted by any interrogation of and/or communication with first transmitter 112, even if that is not the intent of the interrogation. For instance, a user may reads first transmitter 112 with wireless receiver 108 and/or portable computing device 104 for the purpose of obtaining a name or other identifying datum of a subject device 200, and unrelated sensor data may be transmitted to receiver 108 and/or portable computing device 104.

Continuing to refer to FIG. 1, portable computing device may be designed and/or configured to perform any method, method step, or sequence of method steps in any embodiment described in this disclosure, in any order and with any degree of repetition. For instance, portable computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Portable computing device 140 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing. As an example, and without limitation, portable computing device 104 designed and configured to receive a first wireless signal from at least transmitter located at a subject device 200, wherein the first wireless signal identifies the subject device 200, determining a current device status of the subject device 200, generate at least a physical condition instruction regarding the subject device 200, determine that the at least a physical condition instruction has been performed, and update the current device status, for instance as described in further detail below.

Figure 3:
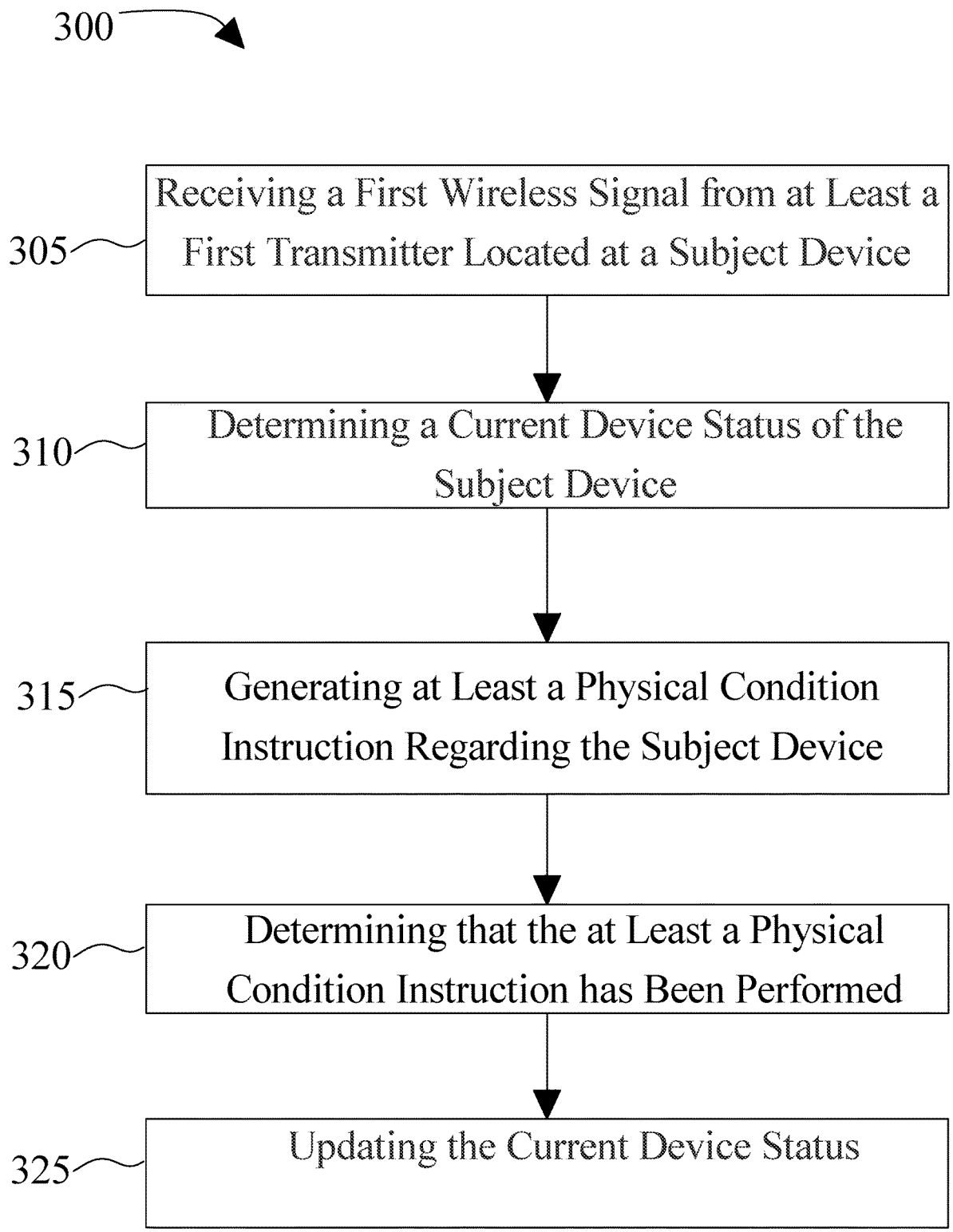
FIG. 3 is a flow diagram illustrating an exemplary embodiment of a method of wireless physical condition instruction generation.

Referring now to FIG. 3, a method 300 of wireless physical condition instruction generation is illustrated. Optionally, a portable computing device 104 operated by a user may provide to a user navigation instructions to at least a first transmitter 112. Portable computing device 104 may be any portable computing device 104 as described above in reference to FIGS. 1-2. Provision of navigation instructions may include determination of a current location of user, determination of a location of at least a first transmitter 112, and generation of one or more instructions for navigating from current location to location of at least a first transmitter 112. Where user is not in the same building and/or navigable space as at least a first transmitter 112, generation of one or more instructions may include generation of instructions using a navigation facility of or in communication with portable computing device 104, as described above. Where user is in the same building and/or navigable space as at least a first transmitter 112, generation of one or more instructions may be performed using data from a data structure such as spatial information data structure 116. In an embodiment, spatial information data structure 116 may contain one or more sets of instructions describing how to navigate from a first point in building and/or navigable space to a second point, such as location of at least a first transmitter 112. One or more sets of instructions may include, as a non-limiting example, instructions to proceed a certain distance in an initial direction, turn right or left, proceed a second distance in a second direction, and the like. One or more sets of instructions may include instructions described in relative terms, such as instructions to go to a nearest shelf to the user and to proceed in a direction along that shelf until arriving at a subsequent shelf, or the like. Portable computing device 104 may append, to the one or more sets of instructions, instructions to proceed to an initial location listed in the one or more sets of instructions, such as a first display structure, entryway, or other "landmark" item or location in navigable space. Instructions may further direct the user to a particular shelf, location on a particular shelf, or the like. Persons skilled in the art, upon reviewing the entirety of this disclosure, will be aware of various ways in which instructions from a first location in navigable space to a second location in navigable space may be generated consistently with this disclosure. Generation of navigation instructions may include generation on portable computing device 104 of one or more instructions, receipt of one or more instructions from a remote device and/or data structure, or a combination thereof. Navigation instructions may include, without limitation, instructions for relative navigation, such as without limitation instruction identifying locations of items in close proximity to a user and/or to portable computing device 104; such instructions may be generated, without limitation, to minimize time spent navigating by user, including without limitation by identifying objects that user does not have to leave a current position to access, items on a same or nearby shelf as an item at which user is located, a component within an item and/or adjacent to first transmitter or a previously accessed element within item, or the like. Navigation instructions may be implemented, without limitation, as described in U.S. Nonprovisional App. Ser. No. 16/247,547, filed on Jan. 14, 2019, and entitled "DEVICES, SYSTEMS, AND METHODS FOR NAVIGATION AND USAGE GUIDANCE IN A NAVIGABLE SPACE USING WIRELESS COMMUNICATION," the entirety of which is incorporated herein by reference.

Continuing to refer to FIG. 3, instructions may be generated based on a user instruction; for instance, a user may enter an instruction in portable computing device 104 to navigate to a product at which at least a first transmitter 112 is located. As a further non-limiting example, user and/or system 100 may initiate a process to complete one or more physical condition instructions or other processes involving one or more subject devices 200 in one or more navigable spaces, as described in further detail below, and portable computing device 104 may generate navigation instructions as a result of that process.

At step 305, and with continued reference to FIG. 3, a portable computing device 104 the method comprising receives a first wireless signal from at least transmitter located at a subject device 200, wherein the first wireless signal identifies the subject device 200. Portable computing device 104 may receive first wireless signal according to any process, and using any components 208, as described above in reference to FIGS. 1-2.

In an embodiment, and still referring to FIG. 3, portable computing device 104 may parse first signal for at least a textual element. Where first signal is in digital form, portable computing device 104 may interpret a digital sequence contained within first signal by rendering it according to an encoding method for one or more data types; for instance, and without limitation, portable computing device 104 may divide a string of binary digits into fixed-length blocks, such as bytes of data, and map 120 those blocks to a data type encoded by those blocks, according to any suitable protocol. As a non-limiting example, portable computing device 104 may interpret a binary string as character data. First signal may be received in a particular format, such as one or two packets; persons skilled in the art, upon reading the entirety of this disclosure, will be aware of many ways in which first signal may be encoded, transmitted, received, and decoded.

Continuing to refer to FIG. 3, portable computing device 104 may extract an identifier of the first transmitter 112 from the at least a textual element. At least a textual element may implement a protocol whereby one or more fields or elements are labeled, such as, without limitation, XML or packet-based protocols. At least a textual element may implement a protocol whereby fields in a prescribed order are separated by delimiter characters, which may be otherwise unused, such as commas in comma separated value (CSV) files. At least a textual element may be ordered in a strict character-count order, in which unique identifier is always found a particular number of characters from an endpoint and has a length of a particular number of characters. Portable computing device 104 may be configured to identify and copy unique identifier according to any protocol in which at least a textual element is encoded. At least a textual element and/or first signal may include, without limitation, a UPC, stock keeping unit (SKU) or other datum linked to a product or item for sale at navigable space. In an embodiment, where first transmitter 112 includes a writable memory section, datum linked to a subject device 200 may be stored in the writable section; such data may be updated upon placement of transmitter with a new device, for instance, when reusing a transmitter previously attached to a disposable component 208 that is being discarded. As a further non-limiting example, information received from and/or associated with first transmitter 112 may include one or more fields indicating one or more components of a status of first transmitter 112; the one or more fields may be, for instance, indicated by tokens and/or flags in a string of data stored in, received from, and/or associated with first transmitter 112. As a non-limiting example, a flag such as "#O" may precede and/or identify a field describing an organization owning and/or associated with first transmitter 112 and/or subject device 200, a flag such as "#L" may identify a current physical location of first transmitter 112 and/or subject device 200, and a flag such as "#DSL" may indicate a lookup address, IP address or other location of or within a data structure for further data describing and/or associated with first transmitter 112 and/or subject device 200; data structure may include any data structure as described in this disclosure. The above examples are for illustrative purposes only; persons skilled in the art, upon reviewing the entirety of this disclosure, will be aware of various alternative implementations that may be used.

Still referring to FIG. 3, portable computing device 104 may extract at least an additional datum. At least an additional datum may include any data described above in reference to FIGS. 1-2, including without limitation data identifying a proprietor and/or entity operating and/or responsible for subject device 200, data identifying and/or linked to a particular location within navigable space, or the like. Portable computing device 104 may provide the at least an additional datum to the user via the user output device 132; at least an additional datum may be provided with a usage sequence as set forward in further detail below or may be provided separately.

Alternatively or additionally, and with continued reference to FIG. 3, where first wireless signal includes a resource locator as described above, portable computing device 104 may navigate to a digital resource identified by the resource locator. For instance, and without limitation, where first wireless signal includes a URL identifying a server, cloud service, data center or the like, portable computing device 104 may transmit one or more elements of data to the server, cloud service, data center, or the like. One or more elements of data may be included and/or embedded in the URL, in which case portable computing device 104 may parse the URL for the one or more elements; alternatively or additionally, the one or more elements embedded in the URL may be forwarded by portable computing device 104 to digital resource, which may return data as a function of the one or more elements. Where signal contains a function call, portable computing device 104 may execute a function as indicated by function call; execution of function may include any execution of any software and/or hardware computer program as described in this disclosure. Alternatively or additionally, portable computing device 104 may forward function calls to a digital resource; digital resource may be stored on portable computing device 104 and/or may be a component of signal as described above. For instance, and without limitation, first wireless signal may include a URL that contains a function call, causing a function call to be forwarded to a digital resource as described above. An identifier of subject device 200 and/or at least a first transmitter 108 may be passed as a parameter to function call and/or as an element of a resource locator; alternatively or additionally, function call and/or resource locator may itself enable portable computing device 104 and/or a digital resource to determine an identify of subject device 200 and/or at least a first transmitter 108. Digital resources may include, without limitation, videos for determining how and/or where to perform a service and/or maintenance act, such as videos showing a specific part and/or component, location of such a part and/or component in or near subject device 200, instructions and/or demonstration for replacement, repair, or other service processes, or the like.

In an embodiment, and still referring to FIG. 3, at least a transmitter may be attached to a component 208 contained within a device of the subject device 200, for instance according to any manner of attachment to and/or location at the component 208 as described above. For instance, and without limitation, at least a transmitter may be attached to a replaceable element of a device of the subject device 200. A user may receive first wireless signal at or near an exterior surface of subject device 200; alternatively or additionally, user may open subject device 200 to "scan" an interior-mounted at least a first transmitter 112. For instance, and without limitation, at least a first transmitter 112 may be attached to a component 208 within subject device 200, which user may locate by opening, moving, or otherwise manipulating subject device 200.

At step 310, and with continued reference to FIG. 3, portable computing device 104 determines a current device status of the subject device 200. Determination of current device status of subject device 200 may include retrieval of current status from device status data structure 124 as described above; current status may include a current state of repair of subject device 200, such as a record entered by a user and/or device as described in this disclosure indicating that the subject device 200 has broken down, is working sub-optimally, is giving off a warning or "maintenance needed" signal, or the like.

Still referring to FIG. 3, current device status may include a current location of the subject device 200. Current location may be retrieved from device status data structure 124; alternatively or additionally current location may be detected by placement of the portable computing device 104 in a map 120 or other data structure representing location, as recorded by a user (e.g., prompted by a user interface), and/or detected using navigation means, motion sensors, IMU, or the like as described above. Detected placement of portable computing device 104 may be detected at approximately the moment that first signal is received; this may enable portable computing device 104 to determine a location of subject device 200 by, for instance, equating the location of the subject device 200 to the location of the portable computing device 104 upon reception of first signal. In an embodiment, portable computing device 104 may compare current location as stored in memory and/or retrieved from device status data structure 124 to detected placement of portable computing device 104. In an embodiment, portable computing device 104 may transmit a request that a signal be sent by first transmitter and/or a subject device 200, such as without limitation a sound, light, or radio signal to help locate the item.

Continuing to refer to FIG. 3, determining current device status may include determining a current service need relating to subject device 200. Current service need may be retrieved from device status data structure 124; alternatively or additionally, current service need may be entered by a user of system 100, including without limitation a user of portable computing device 104. Portable computing device 104 may determine current service need based on a history of physical condition instruction performance, for instance as retrieved from device status data structure 124; history of physical condition instruction performance may be compared, without limitation, to rates of deterioration or replacement requirements as listed, for instance, in physical condition instruction database, with regard to one or more components 208 or other elements within or at subject device 200. Current service need may alternatively or additionally be received from subject device 200; for instance, subject device 200 may include a port or other communication link enabling portable computing device 104 to communicatively connect to subject device 200 and perform a diagnostic process, in which a digital circuit or other state-reflecting or maintaining circuit generates outputs indicative of a current service need. Alternatively or additionally, portable computing device 104 may use a sensor or electrical measurement device such as a multimeter, oscilloscope, temperature sensor, or the like to compute a likely service need of subject device 200; for instance, an ohmmeter, ammeter, and/or voltmeter in communication with portable computing device 104 may detect an circuit parameter such as a voltage, current, and/or degree of resistance between two points in a circuit of subject device 200 and determine that an element of the circuit must be repaired or replaced.

Still referring to FIG. 3, service need may be determined by retrieval and/or determination of a temporal requirement relating to a physical condition of subject device 200. A "temporal requirement," as used herein, is a requirement to perform an action at a time matching a temporal value; temporal value may include a particular calendar data and/or time, an amount of time after a particular event such as purchase and/or activation of subject device 200, a measure of rate of usage such as a mileage on a vehicle or the like, and/or any other time-dependent requirement that may be imposed or established to perform a given service and/or physical action regarding subject device 200. A temporal requirement may, as a non-limiting example, be a warranty requirement; failure to comply with a temporal requirement, in an embodiment, may cause a warranty to be void. A temporal requirement may include a service schedule such as without limitation a manufacturer-suggested service and/or maintenance schedule, a service and/or maintenance schedule promulgated by a proprietor, operator, and/or owner of subject device 200, or any other such requirement and/or set of requirements that may occur to a person skilled in the art upon reviewing the entirety of this disclosure. In an embodiment maintenance history data structure 136 may be used to determine what services have been performed with regard to subject device 200 in the past and/or may be updated when service is recorded as having been performed, as described in further detail above.

At step 315, and still referring to FIG. 3, portable computing device 104 may generate at least a physical condition instruction regarding the subject device 200. Generation of at least a physical condition instruction may include, without limitation, retrieval of at least a physical condition instruction from physical condition instruction data structure 128. For instance, and without limitation, an identifier of subject device 200 obtained using first signal as described above may be used to determine a category of device to which subject device 200 belongs; category of device may in turn be used to retrieve one or more temporal requirements as described above, which may be stored in physical condition instruction data structure 128. A temporal value pertaining to subject device 200, such as a quantity of time that has elapsed since a previous service or maintenance act, since activation, since manufacturing or the like, a usage datum such as mileage or hours of active operation, or the like, may be received from subject device 200, retrieved from device status data structure 124 and/or input by a user of system 100 and/or portable computing device 104; such a temporal value may be used by portable computing device 104 to retrieve one or more temporal requirements from physical condition instruction data structure 128, and/or be compared to at least a temporal requirement retrieved from physical condition instruction data structure 128 as a function of a category of subject device 200 and/or identifier of subject device 200.

With continued reference to FIG. 3, at least a physical condition instruction may include, without limitation, at least a textual instruction describing an act to be performed; at least a textual instruction may include a series of instructions, such as a series of instructions for changing lubrication, replacing a component 208, checking for and/or resolving problems in operation of subject device 200, or the like. At least a textual instruction may include a description and/or identification of a component 208 to be repaired or replaced; description and/or identification may include, without limitation, part numbers, product numbers, descriptions of component 208 parts, or the like, including without limitation two or more equivalent parts.

Still referring to FIG. 3, at least a physical condition instruction may include, without limitation, one or more images; one or more images may include photographs, schematic diagrams, blueprints, circuit diagrams, or the like depicting subject device 200, at least a component 208 of subject device 200, at least a detail of subject device 200, one or more steps and/or processes to be performed with or on subject device 200, or the like. At least a physical condition instruction may include, without limitation, one or more videos depicting subject device 200, at least a component 208 of subject device 200, at least a detail of subject device 200, one or more steps and/or processes to be performed with or on subject device 200, or the like.

With continued reference to FIG. 3, one or more at least a physical condition instruction may include one or more locations; for instance, at least a physical condition instruction may include a location of a warehouse, closet, storage facility, store, waste management and/or disposal facility, recycling facility, or other location where a component 208 may be purchased, obtained, and/or disposed of Portable computing device 104 may, in a non-limiting example, generate one or more navigation instructions to the one or more locations. At least a physical condition instruction may include, without limitation, disposal instructions and/or requirements for a component 208 of subject device 200, such as without limitation instructions for disposal of hazardous materials, instructions for recycling processes to be performed, and/or instructions to return a used and/or waste component 208 to a manufacturer.

In an embodiment, and continuing to refer to FIG. 3, portable computing device 104 may generate at least a physical condition instruction using one or more elements of data retrieved, received, and/or generated as described in this disclosure. For instance, and without limitation, where portable computing device 104 determines that a current location of subject device 200 retrieved from device status data structure 124 differs from a current location of subject device 200 determined using navigation facilities and/or sensor feedback as described above, portable computing device 104 may generate navigation instructions to transport the subject device 200 to the location retrieved from device status data structure 124. Alternatively or additionally, portable computing device 104 may receive and/or retrieve from physical condition instruction data structure 128 an instruction indicating that subject device 200 should be moved to a new location and/or is scheduled to be moved to the new location; portable computing device 104 may generate navigation instructions to new location, according to any process for generation of navigation instructions as described in this disclosure. At least a physical condition instruction may include, without limitation, one or more safety procedures and/or precautions to be performed and/or adhered to during maintenance, service, or the like; in an embodiment, presentation of at least a physical condition instruction may include initial provision of such an instruction, and further instructions may not be provided prior to receipt of confirmation that the initial instruction has been performed. As a non-limiting example, safety procedure and/or precaution may include an instruction to don a safety harness, shut off electrical power to a component, or use or deploy other safety gear. Items such as safety gear may have transmitters as well, which may be used by portable computing device 104 to determine if such items are present and/or engaged; an item may, for instance, have an active transmitter that is powered only when the item is engaged, such as without limitation one having a circuit closed when a buckle is attached or the like. Portable computing device 104 may have an ability to download instructions to memory at a location with access to internet, or other network, and then travel to a transmitter location that does not have access to the internet or other network and perform any of the procedures described herein; this may enable system 100 and/or methods to be used and/or enacted in locations having limited or no network and/or data access.

Further referring to FIG. 3, physical condition instructions may include, without limitation, one or more stages of assembly to be performed during manufacture and/or maintenance of subject device. One or more stages may include, without limitation, completion of assembly and packaging at a manufacturing plant and/or workshop, relocation to a warehouse, retail store, consumer's residence, transfer to maintenance facility, return to consumer, and/or other transportation between locations. Any step or stage provided and/or described with physical condition instructions may be required by a warranty such as a manufacturer's warranty, for instance when and where sold and/or delivered by retailer for initiation of the warranty. Physical condition instruction may include one or more steps for installation of subject device. Physical condition instruction may include one or more checks for proper working conditions before and/or after installation, delivery, maintenance, repair, or the like.

Still referring to FIG. 3, at least a physical condition instruction may include one or more specialized instructions for visually impaired persons. For instance, and without limitation, at least a physical condition instruction may include one or more detailed instructions for location of an item on device relative to another item. For instance, and without limitation, instructions may describe a surface of subject device 200 with which a user may interact to follow at least a physical condition instruction, such as a surface having a keypad or other data entry element, a surface having a panel or opening through which to access one or more elements to replace, a surface bearing one or more elements to be repaired, replaced, and/or otherwise used in performing at least a physical condition instruction, a surface from which one or more connections to other items such as electrical cords, tubes, or the like connecting subject device 200 to power sources, sources of material such as water, air, natural gas, or the like, as well as exhaust tubes and/or vents. Surface may be identified by one or more distinctive features of surface and/or other surfaces; for instance, surface may be defined as having a rectangular shape on it defining a panel, door, opening or the like. As another example, surface may be defined as a smooth surface bordered by two surfaces having distinctive features. Surface may be defined by a perimeter shape. Surface may be described according to orientation relative to other objects in a room or other navigable space containing subject device 200; for instance, surface may be against a wall, or something similar, such as in the case of a refrigerator, washing machine, stove or the like that contains connections to the wall for power or other connections. Surface may be defined as a surface opposite a surface against a wall. Surface may be defined in relation to a user interface component, where a "user interface component" is a component a user utilizes during ordinary operation of subject device 200; for instance, subject device 200 may have a door, a control knob, switches, or other components that user typically accesses to use subject device, and surface may be described as a surface containing or bearing such user interface components, or as a surface adjacent or opposite such a surface.

Further referring to FIG. 3, at least a physical condition instruction may describe how to find service access elements on subject device 200 and/or a surface thereof, where "service access elements" are elements used to perform one or more service and/or maintenance processes on subject device 200. Service access elements may include data entry elements, screws, bolts, or other items to disassemble and/or partially disassemble subject device 200, panels to remove to access an interior of subject device 200, doors, hatches, or the like that may be opened to access an interior of subject device, or the like. Description may describe surface on which to find a service access element, and/or any detail regarding surface access element suitable for use in describing a surface as described above.

Still referring to FIG. 3, at least a physical condition instruction may describe one or more steps to perform with regard to a service access element, such as without limitation instructions for removal of panels, bolts, or the like, disengagement of latches, or otherwise opening up subject device 200. At least a physical condition instruction may reference steps to perform using specific elements, including without limitation instructions for disconnecting power, gas, water, or the like, powering down, performing diagnostic processes, removing, installing, and/or replacing components, changing, flushing, and/or replacing lubricants and/or fluids, or the like.

Still referring to FIG. 3, physical condition instruction data structure 128 may contain a plurality of versions of each instruction. For instance, plurality of versions may include a first version providing instructions for users with unimpaired vision, a second version for users with visual impairment but some ability to discern shapes, and/or a third version for users who are blind. First version may, for instance, relate instructions to written labels, visual cues, and the like, while second and/or third versions may rely increasingly on location of tactile cues and/or landmarks, traversal of surfaces therefrom to discover service access elements, and repetition of such landmark and related information upon exposure of interiors or additional surfaces. Portable computing device 104 may match user to instruction type; for instance a user who is identified in system 100 as visually impaired and/or blind may be matched to instructions for a user with such impairments, which portable computing device and/or a device in communication therewith may retrieve from physical condition instruction data structure 128. Alternatively or additionally, a user may be prompted to provide feedback regarding clarity and/or ease of instructions. Feedback, and/or data indicating completion of processes pursuant to instructions may be matched to a category of user impairment and/or a category of instructions; instructions of a version matching such category may be retrieved.

Further referring to FIG. 3, instruction versions for visually impaired and/or blind people may include one or more substitutes for color in describing elements. For instance, a shape, orientation, and/or location of an object may be used as a substitute for its color in describing it. Alternatively or additionally, where instructions differentiate elements in terms of color but not in other ways, portable computing device may capture an image of a portion of subject device 200. Portion may be identified, for instance, by comparing red, green, and blue numerical values of objects to ranges corresponding to described colors. Portable computing device 104 may locate a detected object relative to other objects using a coordinate system of camera focal array, using for instance and without limitation edge detection algorithms. An "edge detection algorithm," as used in this disclosure, includes a mathematical method that identifies points in a digital image at which the image brightness changes sharply and/or has discontinuities. In an embodiment, such points may be organized into straight and/or curved line segments, which may be referred to as "edges." Edge detection may be performed using any suitable edge detection algorithm, including without limitation Canny edge detection, Sobel operator edge detection, Prewitt operator edge detection, Laplacian operator edge detection, and/or Differential edge detection. Edge detection may include phase congruency-based edge detection, which finds all locations of an image where all sinusoids in the frequency domain, for instance as generated using a Fourier decomposition, may have matching phases which may indicate a location of an edge.

Still referring to FIG. 3, objects detected using edge detection or other processes may be identified without limitation using an object classifier. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Portable computing device 104 and/or another device may generate a classifier using a classification algorithm, defined as a processes whereby a portable computing device 104 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, Fisher's linear discriminant, quadratic classifiers, decision trees, boosted trees, random forest classifiers, kernel estimation, learning vector quantization, and/or neural network-based classifiers.

Still referring to FIG. 3, object classifier may be generated, as a non-limiting example, using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)÷(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Portable computing device 104 may then calculate a likelihood table by calculating probabilities of different data entries and classification labels. Portable computing device 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

Still referring to FIG. 3, portable computing device 104 may be configured to train an object classifier using any classification algorithm described above operating on training data. "Training data," as used herein, is data containing correlations that a machine-learning process, such as a classifier, may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and further referring to FIG. 3, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. Training data used to train object classifier may include a plurality of entries, each including attributes of an image such as a portion of a frame of a plurality of frames, and/or a shape detected therein, which may be used to classify the image to other images in training data.

Still referring to FIG. 3, a user may verbally and/or manually enter one or more directions and/or instructions, which may in turn be recorded in physical condition instruction data structure 128. User-entered instruction may be linked to one or more user identifiers and/or to identifiers of classes of users; for instance a user may enter instruction, based on what user or another person found useful as guidance in performing maintenance and/or service, and link it to a group of users that share a common disability, a group of users that work and/or live in a given institution, a group of friends and/or contacts linked to identifier of user, or the like.

At step 320, and still referring to FIG. 3, portable computing device 104 determines that the at least a physical condition instruction has been performed. Determining that the at least a physical condition instruction has been performed may include, without limitation, receiving a user indication that a service action has been performed on the device. As a further non-limiting example, determining that the at least a physical condition instruction has been performed may include detecting that the portable computing device 104 has been moved to the correct location; portable computing device 104 may additionally receive a second signal from at least a first transmitter 112, which may be used to confirm that the subject device 200 has been moved to the same location to which portable computing device 104 has moved. Determination may include receiving a second signal from a second transmitter 204 at the subject device 200 and generating the updated device status as a function of the second signal. For instance, and without limitation a second transmitter 204 may be attached to a component 208 replacement component 208 required to be installed by at least physical condition instruction, installment of which the user can confirm, at least in part, by "scanning" second transmitter 204. As a further non-limiting example, second transmitter 204 may be attached to a component 208 that was removed; for instance, after determining using any combination of navigation facilities, data structures, or the like as described above that portable computer moved to a disposal location to which removed component 208 is to be taken according to physical condition instructions, reception of a signal from second transmitter 204 at that location may be used to verify that component 208 has been transported to the disposal facility. Similarly, portable computing device 104 may provide directions to a component such as a replacement component, and identify component upon detection of a transmitter attached thereto.

With continued reference to FIG. 3, the above steps may be performed iteratively, in the form of textual and/or verbal "step-by-step" instructions, where after each instruction portable computing device 104 waits for acknowledgement from user, and/or detection by portable computing device 104, of performance of previous step. For instance, and without limitation, some steps may be verified by sensor and/or receiver feedback; as an illustrative example, portable computing device 104 may determine that user has removed an old part to be replaced where a transmitter appended thereto is not in range anymore while a transmitter of subject device 200 is in range. Similarly, simultaneous detection of new part and device transmitters in range of NFC/passive tag interrogator may indicate to portable computing device 104 that new part is at subject device 200.

Still referring to FIG. 3, portable computing device 104 may further be configured to detect when a user is having difficulty, such as for instance when user does not indicate completion of a step after a threshold amount of time has elapsed. Portable computing device 104, upon such detection, may provide a user prompt to user, for instance suggesting calling for assistance from another user or the like.

At step 325, and still referring to FIG. 3, portable computing device 104 updates the current device status. Updating the current device status may include generating a record indicating that physical condition instruction has been performed. Record may include an identification of physical condition instruction within physical condition instruction data structure 128, a textual description of physical condition instruction, or the like. Record may include metadata, including without limitation a location, time, and/or user associated with and/or performing physical condition instruction; metadata may be generated automatically by portable computing device 104, using, for instance, navigation facilities, sensors, any means to determine a current time that a computing device as described in this disclosure may have access to, user information and/or user account information stored on portable computing device 104, or the like. Record may include a picture of the performed operation. Record may include a video of the operation being performed. Where determining that the at least a physical condition instruction has been performed includes receiving a user indication that a service action has been performed on the device, generating a record and/or updated device status may include generating a record indicating that service has been performed. Where determining that the at least a physical condition instruction has been performed includes receiving a second signal from a second transmitter 204 at the subject device 200, generating a record and/or updating device status may include generating a record and/or updated device status as a function of the second signal. As a non-limiting example, where a second signal identifies a replacement component 208 of subject device 200, generating an updated status and/or a record may include generating a record indicating that the replacement component 208 has been installed at the subject device 200. Updated information may be transmitted to a data structure on a remote device such as a server or other device. Updated information may be posted to device status data structure 124 and/or physical condition instruction data structure 128.

Although particular embodiments of method 300 have been described above for exemplary and/or illustrative purposes, any combination of any steps and/or embodiments thereof as described above, in any degree of repetition, and with any omitted steps, is contemplated as within the scope of this disclosure. For instance, and without limitation, a method as contemplated herein may include receiving a first wireless signal as described above and determining a current status of the subject device 200, as described above, with or without generation of a physical condition instruction, determination that at least a physical condition instruction has been performed, and/or updating a current device status. As a further non-limiting example, a method as contemplated herein may include receiving a first wireless signal as described above and generation of a physical condition instruction, as described above, with or without determining a current status of the subject device 200, determination that at least a physical condition instruction has been performed, and/or updating a current device status. As an additional non-limiting example, a method as contemplated herein may include receiving a first wireless signal as described above and determination that at least a physical condition instruction has been performed, as described above, with or without determining a current status of the subject device 200, generation of a physical condition instruction, and/or updating a current device status. As yet another non-limiting example, a method as contemplated herein may include receiving a first wireless signal as described above and updating a current device status, as described above, with or without determining a current status of the subject device 200, generation of a physical condition instruction, and/or determination that at least a physical condition instruction has been performed. Further examples of methods as contemplated herein may include any of the above examples without reception of first wireless signal. Persons skilled in the art, upon reviewing the entirety of this disclosure, will be aware of various additional or alternative combinations of steps and/or system components 208 that are within the scope of this disclosure.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 4:
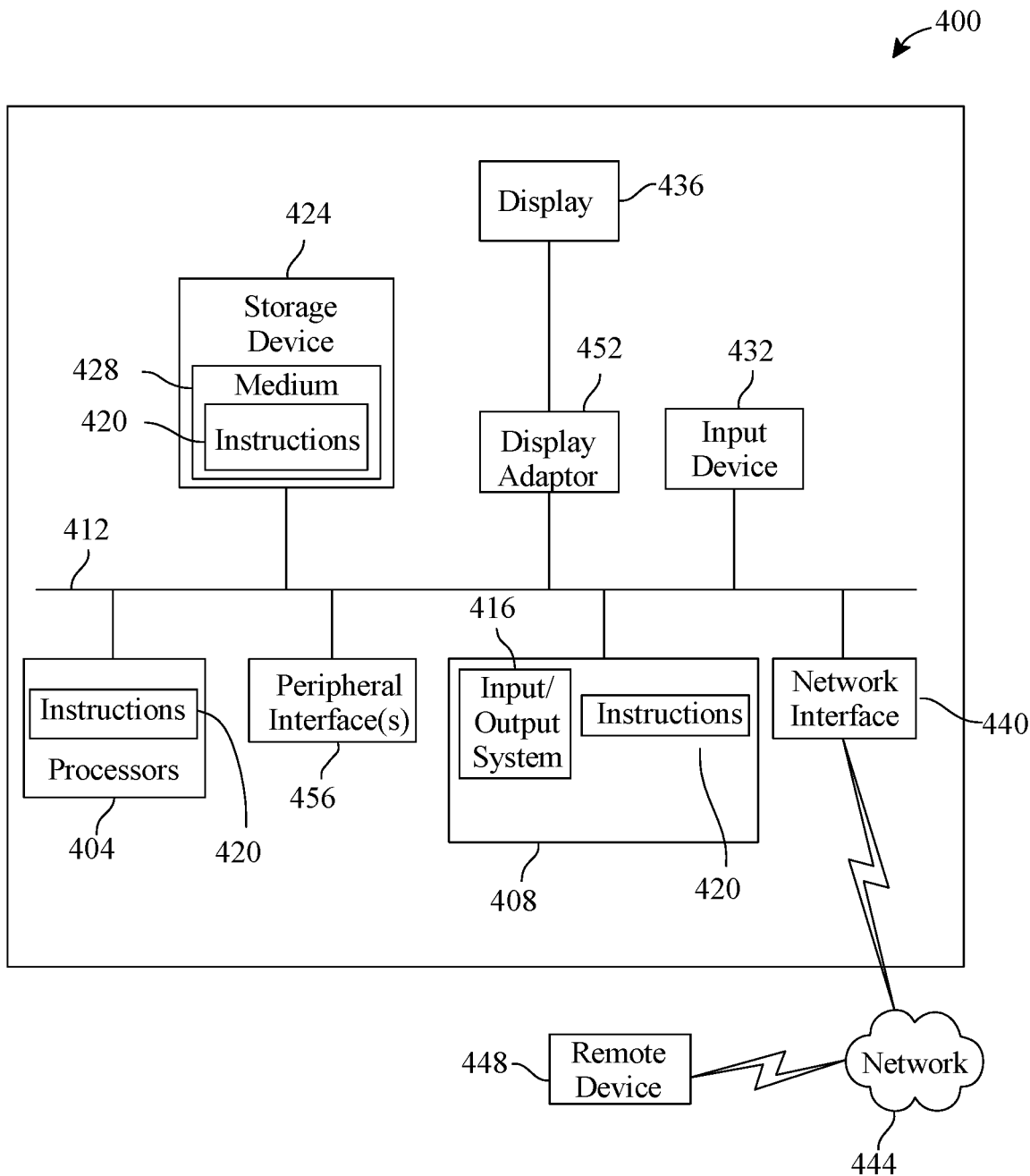
FIG. 4 is a block diagram of a computing system that can be used to implement any one or more of the methodologies disclosed herein and any one or more portions thereof.

FIG. 4 shows a diagrammatic representation of one embodiment of a computing device in the exemplary form of a computer system 400 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 400 includes a processor 404 and a memory 408 that communicate with each other, and with other components, via a bus 412. Bus 412 may include any of several types of bus structures including, but not limited to, a memory bus, a memory controller, a peripheral bus, a local bus, and any combinations thereof, using any of a variety of bus architectures.

Processor 404 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 404 may be organized according to Von Neumann and/or Harvard architecture as a non-limiting example. Processor 404 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC)

Memory 408 may include various components (e.g., machine-readable media) including, but not limited to, a random-access memory component, a read only component, and any combinations thereof. In one example, a basic input/output system 416 (BIOS), including basic routines that help to transfer information between elements within computer system 400, such as during start-up, may be stored in memory 408. Memory 408 may also include (e.g., stored on one or more machine-readable media) instructions (e.g., software) 420 embodying any one or more of the aspects and/or methodologies of the present disclosure. In another example, memory 408 may further include any number of program modules including, but not limited to, an operating system, one or more application programs, other program modules, program data, and any combinations thereof.

Computer system 400 may also include a storage device 424. Examples of a storage device (e.g., storage device 424) include, but are not limited to, a hard disk drive, a magnetic disk drive, an optical disc drive in combination with an optical medium, a solid-state memory device, and any combinations thereof. Storage device 424 may be connected to bus 412 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 424 (or one or more components thereof) may be removably interfaced with computer system 400 (e.g., via an external port connector (not shown)). Particularly, storage device 424 and an associated machine-readable medium 428 may provide nonvolatile and/or volatile storage of machine-readable instructions, data structures, program modules, and/or other data for computer system 400. In one example, software 420 may reside, completely or partially, within machine-readable medium 428. In another example, software 420 may reside, completely or partially, within processor 404.

Computer system 400 may also include an input device 432. In one example, a user of computer system 400 may enter commands and/or other information into computer system 400 via input device 432. Examples of an input device 432 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 432 may be interfaced to bus 412 via any of a variety of interfaces (not shown) including, but not limited to, a serial interface, a parallel interface, a game port, a USB interface, a FIREWIRE interface, a direct interface to bus 412, and any combinations thereof. Input device 432 may include a touch screen interface that may be a part of or separate from display 436, discussed further below. Input device 432 may be utilized as a user selection device for selecting one or more graphical representations in a graphical interface as described above.

A user may also input commands and/or other information to computer system 400 via storage device 424 (e.g., a removable disk drive, a flash drive, etc.) and/or network interface device 440. A network interface device, such as network interface device 440, may be utilized for connecting computer system 400 to one or more of a variety of networks, such as network 444, and one or more remote devices 448 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 444, may employ a wired and/or a wireless mode of communication. In general, any network topology may be used. Information (e.g., data, software 420, etc.) may be communicated to and/or from computer system 400 via network interface device 440.

Computer system 400 may further include a video display adapter 452 for communicating a displayable image to a display device, such as display device 436. Examples of a display device include, but are not limited to, a liquid crystal display (LCD), a cathode ray tube (CRT), a plasma display, a light emitting diode (LED) display, and any combinations thereof. Display adapter 452 and display device 436 may be utilized in combination with processor 404 to provide graphical representations of aspects of the present disclosure. In addition to a display device, computer system 400 may include one or more other peripheral output devices including, but not limited to, an audio speaker, a printer, and any combinations thereof. Such peripheral output devices may be connected to bus 412 via a peripheral interface 456. Examples of a peripheral interface include, but are not limited to, a serial port, a USB connection, a FIREWIRE connection, a parallel connection, and any combinations thereof. Display device 436 may include a holographic and/or hologram device. Display device may include any display device and/or apparatus used in virtual reality and/or augmented reality or the like, including without limitation incorporation of or in a head mounted display, a head-up display, a display incorporated in eyeglasses, googles, headsets, helmet display systems, or the like, a display incorporated in contact lenses, an eye tap display system including without limitation a laser eye tap device, VRD, or the like.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention

What is claimed is:

1. A system for wireless physical condition instruction generation, the system comprising:
 a portable computing device in communication with a wireless receiver, wherein the portable computing device comprises:
  at least a processor; and
  a memory communicatively connected to the at least processor, the memory containing instructions configuring the at least processor to:

receive a first wireless signal from at least transmitter located at a subject device at a first location, wherein the first wireless signal identifies the subject device;

determine a current device status of the subject device, wherein the current device status is linked with a maintenance history data structure accessible by an authorized party, wherein the maintenance history data structure is configured for an implementation of spatial information data structure;

generate at least a physical condition instruction regarding the subject device, wherein:

generating the at least physical condition instruction comprises retrieval of at least a physical condition instruction from physical condition instruction data structure containing a plurality of versions of a physical condition instruction based on visual impairments of a user;

the physical location instruction includes a second location of a replacement component, wherein the second location is different from the first location; and generating the at least a physical condition instruction further comprises providing navigation instructions from the first location to the second location presented to the user in an audio form and a visual form, and tactile information generated by a tactile output device that is intelligible via haptic feedback;

determine that the at least a physical condition instruction has been performed, wherein determining further comprises:

receiving a second signal from a second transmitter at the replacement component located in the second location; and identifying the replacement component based on the signal; and update the current device status, wherein updating the current device status further comprises:

receiving a second signal from a second transmitter at the subject device, wherein the second signal identifies a replacement component of the subject device; and updating the current device status as a function of the second signal, updating the current device status further comprises generating a record indicating that the replacement component has been installed at the subject device.

2. The system of claim 1, wherein the at least a transmitter is attached to a component contained within the subject device.

3. The system of claim 1, wherein the at least a transmitter is attached to a replaceable element of the subject device.

4. The system of claim 1, wherein the current device status further comprises a current location of the subject device, wherein detecting the current location further comprises detecting a placement of the portable computing device.

5. The system of claim 1, wherein determining the current device status further comprises retrieving the current device status from a data structure listing device status data.

6. The system of claim 1, wherein determining the current device status further comprises determining a current service need relating to the subject device, wherein retrieving the current service need further comprises retrieving the current service need from the device status structure, and the current service need is entered by a user of the system into the device status structure.

7. The system of claim 1, wherein determining the current device status further comprises determining a temporal requirement relating to a physical condition of the subject device.

8. The system of claim 1, wherein updating the current device status further comprises:

generating a record indicating the physical condition instruction performance;

receiving a second signal from a second transmitter at the subject device; and updating the current device status as a function of the second signal.

9. The system of claim 1, wherein detecting an object comprises:

retrieving physical attribute information from a regional descriptive data stored using building information modeling (BIM);

generating an object classifier using a portable computing device, wherein the portable computing device derives a classifier from training data, comprising correlations that a machine-learning process uses to model relationships between two or more categories of data elements; and using the object classifier configured to output at least a datum that labels or otherwise identities a set of data that are clustered together.

10. The system of claim 1, wherein detecting an object relative to other objects comprises:

capturing an image of a portion of the subject device with the portable computing device;

locating a detected object relative to other objects using a coordinate system of camera focal array; and differentiating elements using the portable computing system using an edge detection algorithm.

11. A method of wireless physical condition instruction generation, the method comprising:

receiving, at a portable computing device, a first wireless signal from at least a first transmitter located at a subject device, wherein the first wireless signal identifies the subject device;

determining, at the portable computing device, a current device status of the subject device, wherein the current device status is linked with a maintenance history data structure accessible by an authorized party, wherein the maintenance history data structure is configured for an implementation of spatial information data structure;

generating, by the portable computing device, at least a physical condition instruction regarding the subject device, wherein:

generating the at least a physical condition instruction comprises retrieval of at least a physical condition instruction from physical condition instruction data structure containing a plurality of versions of a physical condition instruction based on visual impairments of a user;

the physical location instruction includes a second location of a replacement component, wherein the second location is different from the first location; and generating the at least a physical condition instruction further comprises providing navigation instructions from the first location to the second location presented to the user in an audio form and a visual form, and tactile information generated by a tactile output device that is intelligible via haptic feedback;
determining, by the portable computing device, that the at least a physical condition instruction has been performed, wherein determining further comprises:
  receiving a second signal from a second transmitter at the replacement component located in the second location; and
  identifying the replacement component based on the signal; and
updating, by the portable computing device, the current device status, wherein updating the current device status further comprises:
  receiving a second signal from a second transmitter at the subject device, wherein the second signal identifies a replacement component of the subject device; and
  updating the current device status as a function of the second signal, updating the current device status further comprises generating a record indicating that the replacement component has been installed at the subject device.

12. The method of claim 11, wherein the at least a transmitter is attached to a component contained within the subject device.

13. The method of claim 11, wherein the at least a transmitter is attached to a replaceable element of the subject device.

14. The method of claim 11, wherein the current device status further comprises a current location of the subject device.

15. The method of claim 11, wherein determining the current device status further comprises retrieving the current device status from a data structure listing device status data.

16. The method of claim 11, wherein determining the current device status further comprises determining a current service need relating to the device.

17. The method of claim 11, wherein determining the current device status further comprises determining a temporal requirement relating to a physical condition of the subject device.

18. The method of claim 11, wherein updating the current device status further comprises:
  receiving a second signal from a second transmitter at the subject device; and
  updating the current device status as a function of the second signal.

19. The method of claim 11, wherein detecting an object comprises:
  retrieving physical attribute information from a regional descriptive data stored using building information modeling (BIM);
  generating an object classifier using a portable computing device, wherein the portable computing device derives a classifier from training data, comprising correlations that a machine-learning process uses to model relationships between two or more categories of data elements; and
  using the object classifier configured to output at least a datum that labels or otherwise identities a set of data that are clustered together.

20. The method of claim 11, wherein detecting an object relative to other objects comprises:
  capturing an image of a portion of the subject device with the portable computing device;
  locating a detected object relative to other objects using a coordinate system of camera focal array; and
  differentiating elements using the portable computing system using one of an edge detection algorithms.

* * * * *